United States Patent [19]

Utsuno et al.

[11] Patent Number: 5,704,157
[45] Date of Patent: Jan. 6, 1998

[54] PASS-THROUGH FISHING ROD

[75] Inventors: Nobuyoshi Utsuno; Isamu Tokuda, both of Sakai, Japan

[73] Assignee: Shimano, Inc., Osaka, Japan

[21] Appl. No.: 496,032

[22] Filed: Jun. 28, 1995

[30] Foreign Application Priority Data

Jul. 1, 1994 [JP] Japan .................. 6-150742

[51] Int. Cl.[6] ............................................. A01K 87/04
[52] U.S. Cl. ............................................. 43/24; 43/18.1
[58] Field of Search ............................... 43/18.1, 24

[56] References Cited

U.S. PATENT DOCUMENTS

| 2,334,646 | 11/1943 | Price ............... 43/24 |
| 2,777,239 | 1/1957 | Cushman ............ 43/24 |
| 3,513,582 | 5/1970 | Cavabasse .......... 43/24 |
| 3,862,509 | 1/1975 | Petersen ........... 43/24 |
| 4,212,126 | 7/1980 | Barnett ............ 43/24 |

FOREIGN PATENT DOCUMENTS

| 249360 | 8/1963 | Australia ............... 43/24 |
| 1385014 | 1/1964 | France ................. 43/24 |
| 1374960 | 9/1964 | France ................. 43/24 |
| 2666721 | 3/1992 | France ................. 43/24 |
| 3246801 | 6/1984 | Germany ................ 43/24 |
| 1-304836 | 12/1989 | Japan . |
| 1209513 | 11/1970 | United Kingdom . |

*Primary Examiner*—Kurt Rowan
*Attorney, Agent, or Firm*—Jeffer, Mangels, Butler & Marmaro LLP

[57] ABSTRACT

A pass-through fishing rod comprising a line support and retainers prevents a fishing line from contacting the inner surface of a rod or water adhering to the inner surface and enables the line to be drawn out and rolled up smoothly. The line support pitch of the line support supporting a fishing line is smaller than the retention pitch of the retainers for retaining the line support spaced from the inner surface of the rod.

6 Claims, 10 Drawing Sheets

PASS-THROUGH FISHING ROD

FIELD OF THE INVENTION

The present invention relates to a pass-through fishing rod.

BACKGROUND OF THE INVENTION

In a pass-through fishing rod, since a fishing line is passed through a path formed inside a rod so as to be drawn out from the rod or rolled up into the rod together with fishing equipment combined with the line, resistance acts on the movement of the line due to the line's contact with the surface of the wall of the path. In particular, if water is collected in the path, the line contacts the water to increase the sliding resistance, thereby reducing the operability of the rod during the draw-out or roll-up of the fishing equipment.

In known fishing rods adapted to reduce such sliding resistance, a spiral line support is installed in a path inside the rod and the upward facing section of the inner surface of the support is used as a line support section. See, for example, Japanese patent JP-A-1-304836.

However, the above conventional structure using a spiral as a line support requires the support to be inserted into the internal path of a rod, limiting the coil diameter, thereby preventing the introduction of a large element wire diameter. It has thus been impossible to provide a large space between the inner surface of a spiral and the inner surface of a rod.

Consequently, a line located between adjacent line support sections may slag even though it is supported by the inner surface of a spiral, or may approach the inner surface of a rod and contact water adhering thereto during line roll-up due to the curvature of the rod. This prevents a line from being drawn up quickly.

It is an object of this invention to provide a pass-through fishing rod that minimizes a line's contact with water adhering to the inner surface of a rod to enable the line to be drawn out quickly.

SUMMARY OF THE PREFERRED EMBODIMENTS

A pass-through fishing rod is characterized in that a line support comprises a plurality of line support sections spaced along the shaft center of the rod for supporting a fishing line and that the line support pitch of the line support sections is smaller than the retention pitch at which the line support sections are retained inside the rod while spaced from the inner surface of the rod.

By retaining a line support spaced from the inner surface of a rod, line support sections can be spaced from the inner surface of the rod, and a fishing line supported by the line support sections can in turn be spaced from the inner surface of the rod.

This minimizes opportunities for a line to contact water adhering to the inner surface of a rod. Furthermore, since the line support pitch is smaller than the retention pitch, the space between a line located between adjacent line support sections and the inner surface of a rod can be maintained, minimizing the amount of the line's sagging.

The present invention minimizes opportunities for a line located between adjacent line supports to contact water and reduces sliding resistance during line roll-up, employing the structure wherein the line support pitch is smaller than the retention pitch.

A preferred embodiment of the present invention is characterized in that a line support comprises a plurality of line support sections spaced along the shaft center of a rod for supporting a fishing line, and that a plurality of retainers for supporting the fishing line with the outer surface of the line support spaced from the inner surface of the rod are spaced along the shaft center of the rod. The line support pitch of the line support sections is smaller than the retention pitch of the retainers. The advantages and effects of this structure are as follows.

By retaining the line support spaced from the inner surface of the rod, the line support sections can be spaced from the inner surface of the rod, and a fishing line supported by the line support sections can in turn be spaced from the inner surface of the rod.

This minimizes opportunities for a line to contact water adhering to the inner surface of the rod.

Furthermore, since the line support pitch is smaller than the retention pitch, even the space between a line located between adjacent line support sections and the inner surface of the rod can be maintained with the amount of the line's sagging minimized.

With the above advantages, this embodiment of the invention minimizes opportunities for line located between adjacent line supports to contact water and reduces sliding resistance during line roll-up, employing improved installation pitches for the line support sections and the retainer.

Another embodiment of the present invention is characterized in that a longitudinally long line support is located in the space in the rod and that the line support comprises a plurality of line support sections supporting a fishing line and a connecting section connecting adjacent line supports together. A plurality of retainers that act on part of the line support sections to set a gap between the line support and the inner surface of the rod are provided, and the interval between adjacent retainers is larger than the interval between adjacent line support sections located between the adjacent retainers. The advantages and effects of this embodiment of the invention are as follows.

Since a plurality of retainers act on part of the line support sections to retain them, the line support is spaced further from the inner surface of the rod than a line supported by the line support sections. Since the interval between adjacent retainers is larger than the interval between adjacent line support sections, the magnitude of the sagging of a line is smaller than the interval between adjacent line support sections, so that the line's contact with water adhering to the inner surface of the rod can be avoided, allowing the line to be drawn out smoothly.

A further embodiment of this invention is characterized in that the retainers are located in the large diameter section of the rod. The advantages and effects of this embodiment of the invention are as follows.

By inserting the retainers into the large diameter side into which fishing equipment can be inserted more easily, the space between the line support and the inner surface of the rod can be maintained, and sliding resistance on the line can be reduced, thereby allowing the insertion of the retainers and the assembly of the rod to be carried out easily.

Another embodiment of this invention is characterized in that the retainers are located in at least two positions including those in the large diameter section and the small diameter section. Furthermore, since the line support is supported in two or more sections, it can be supported over an appropriate span, and this embodiment of the invention can be used even for a tip rod structure of a relatively large diameter into which the line support can be inserted easily either from the rear end or from the front end.

Another embodiment of this invention is characterized in that the line support is a spiral.

Since the line support is a spiral and the line support sections are formed as a continuous line of spiral, the plurality of line support sections can be handled as a single unit and be supported easily by the retainers. The line support can also be inserted into the rod easily because the plurality of line support sections can be handled as a single continuous unit.

Another embodiment of this invention is characterized in that the line support comprises a spiral and a thin cylinder externally fit to the spiral. The advantages and effects of this embodiment of the invention are as follows.

Since the spiral is reinforced by the thin cylinder, it can be inserted into a tip rod of a small diameter even when having a small diameter and a relatively low strength. The strength of the spiral which is low due to its small diameter is enhanced by the cylinder of a thin structure to prevent a decrease in flexibility and an increase in weight.

Another embodiment of this invention is characterized in that the line support comprises ring-like line support sections and a connecting rod section joining the line support sections together. The advantages and effects of this embodiment of the invention are as follows.

Since the line support sections are like rings and independent of each other but connected by the connecting rod section, they can be handled as a single unit when inserted into the rod. As a result, this invention provides good workability and allows the positioning of the line support sections and the setting of the line support pitch to be arbitrarily performed.

Another embodiment of the invention is characterized in that a longitudinal through hole for allowing water to pass through is formed in the retainers.

That is, water entering the rod can be moved through the longitudinal through hole to the tip of the rod where it can be discharged so that it will not be collected in the rod.

Another embodiment of the invention is characterized in that the front end of said line support is supported by the inner surface of the rod while the rear end of the line support is supported by the retainers so that the section behind the front end of the line support is spaced from the inner surface of the rod. The advantages and effects of this embodiment of the invention are as follows.

The line's contact with the inner surface of the rod can be avoided by using the inner surface of the rod as a retainer at the front end from which retainers cannot be inserted easily while inserting retainers from the rear end of a relatively large diameter than the front end to space the line support from the inner surface of the rod.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
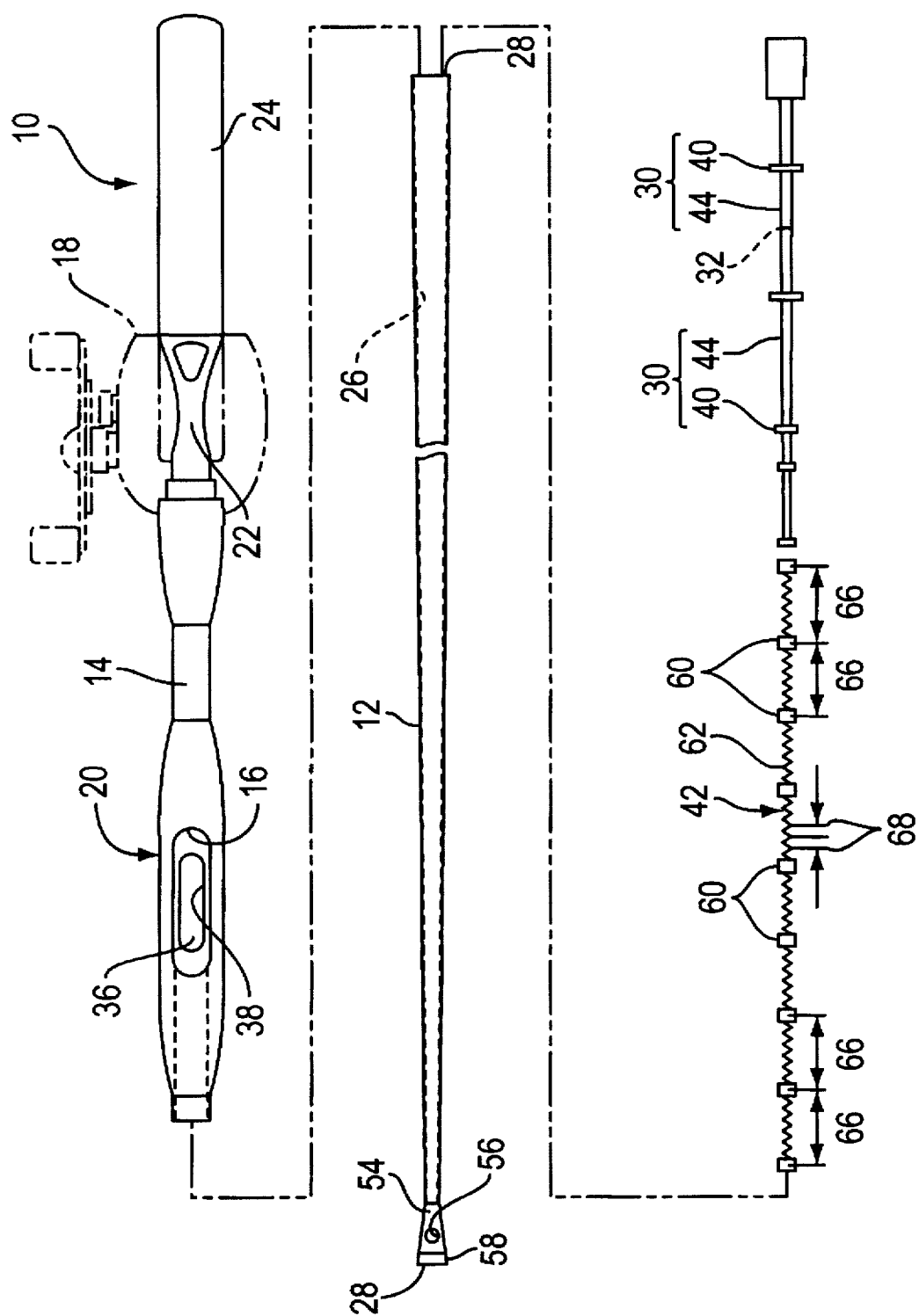
FIG. 1 is a plan of a line support, retainers, and an internal body before their insertion.

With reference now to FIG. 1, lure rod 10 comprises a first rod section 12 located at the tip and a second rod section 14 located on the bottom end of the rod with the first and the second rod sections connected in parallel. The second rod section 14 has a line introduction hole 16 for inserting a line from a reel 18 into a wide section formed as a line introduction section 20 in the front end section and also has a reel seat 22 and a grip 24 behind the line introduction hole. The second rod section 12 comprises an internal path 26 leading from the line introduction hole 16 to a tip opening 28. An internal body 30 forming a line insertion and passage path 32 can be inserted from a rear end opening 34 in the first rod section 12.

The line introduction section 20 can be connected to or disconnected from the rear end of the first rod section 12 in parallel, and is formed to have a large width. The line introduction hole 16 that is longitudinally long is formed in the longitudinal center of the line introduction section 20, an internal space is formed inside the line introduction section 20, and a path leading to the internal path 26 is formed in a position in front of the line introduction hole 16. The rear end of this path enters the internal space from the front end of the line introduction hole 16 and can be seen externally from the line introduction hole 16. The internal space formed between the rear end of the space 26 and the line introduction hole 16 is used as a communication space 36 for guiding to the rear end of the space 26 (the internal space for inserting and passing a line) a line introduced from the line introduction hole 16.

An internal-external through hole 38 is formed on the lower surface of the line introduction section 20 and located symmetrically 180° from to the line introduction hole 16. It is shaped like a longitudinally long hole and has shorter longitudinal length and width than the line introduction hole 16. Dirt entering the line insertion and passage path 32 adheres to a line and is then moved to the communication space 36, where it falls and is then discharged through the internal-external through hole 38. As a result, dirt adhering to a line rolled up by the reel 18 can be reduced.

Figure 3:
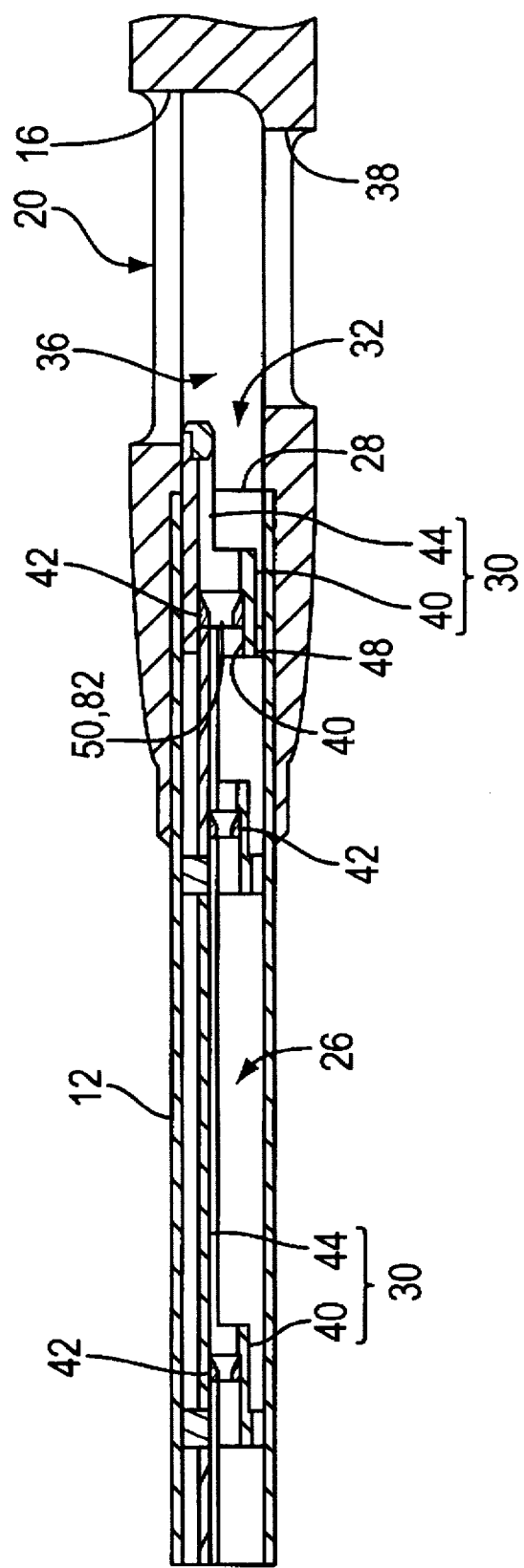
FIG. 3 is a longitudinal sectional side view of an internal body installed.
Figure 4:
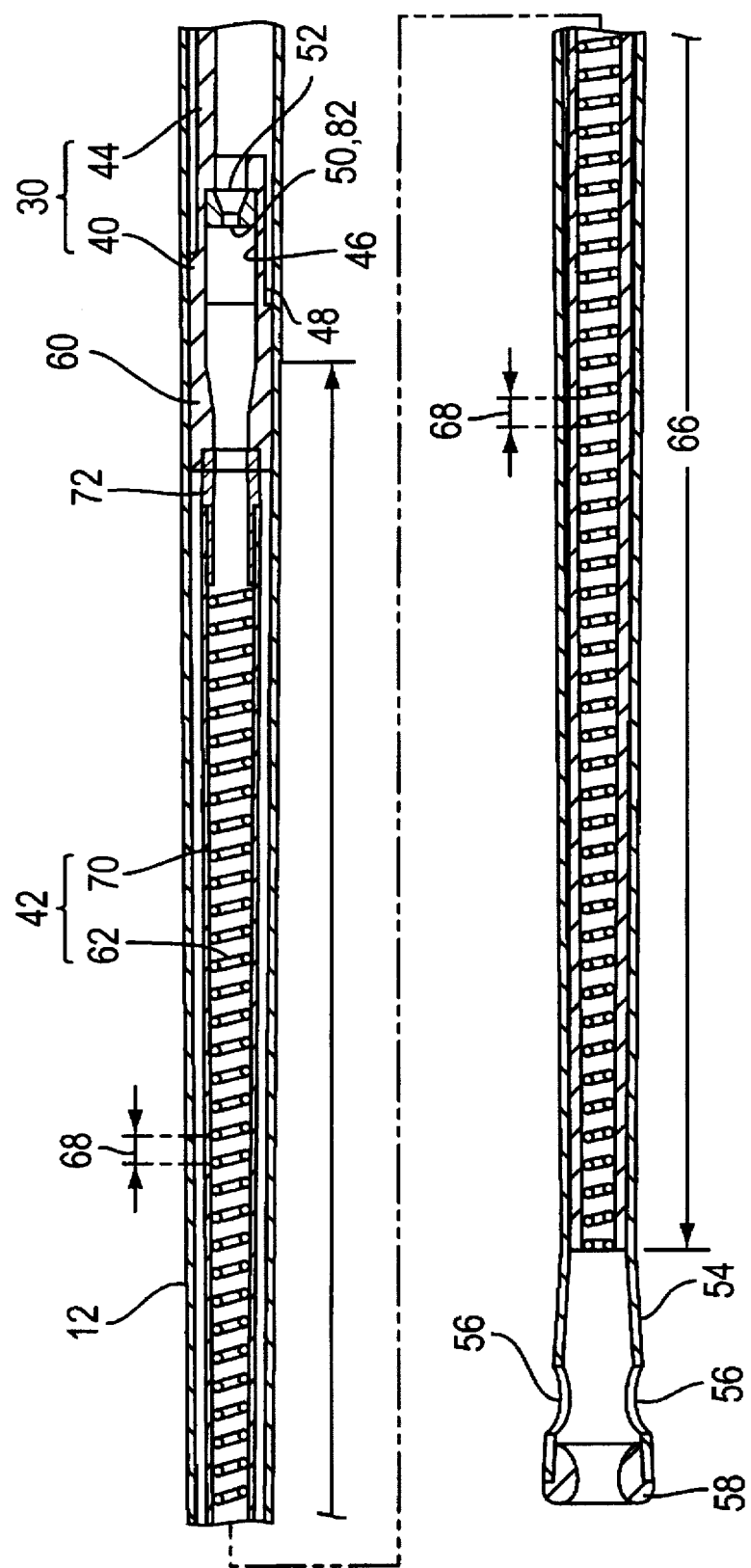
FIG. 4 is a longitudinal sectional side view of another embodiment structure for the line support and the retainers shown in FIG. 2.

FIGS. 1, 3, and 4 show that the internal body 30 is installed in the rear half section of the first rod section 12 and has the following configuration. A plurality of units each of which comprises a cylindrical section 40 where the line support 42 is installed, and a connecting rod section 44 extending rearwardly from the cylindrical section 40 like a cantilever, are bonded and connected together so as to have a length equivalent to a single fishing rod. The cylindrical section 40 has formed in its center a through hole 46 into which the line support is inserted and loaded, with the connecting rod section 44 extending from a position above the shaft center of the through hole 46. This positioning of the connecting rod section 44 allows water entering the rod to flow unaffected by the connecting rod section 44. In addition to this configuration, the formation of the longitudinal through hole 48 in the cylindrical section 40 allows water entering the rod to be guided to the internal-external through hole 38 for draining, where the water is discharged. The connecting rod section 44 is formed by removing most of the corresponding wall of the cylindrical section 40 and assumes an approximate crescent cross section. The internal body 30 generally comprises thermoplastic resin without reinforced fibers but may also comprise rubber. In this embodiment, it is formed of a material more flexible than the rod 10. The thermoplastic resins useful in the present invention include polyethylene, polypropylene, nylon, ABS, and most preferably is a material having high water repellency.

Figure 2:
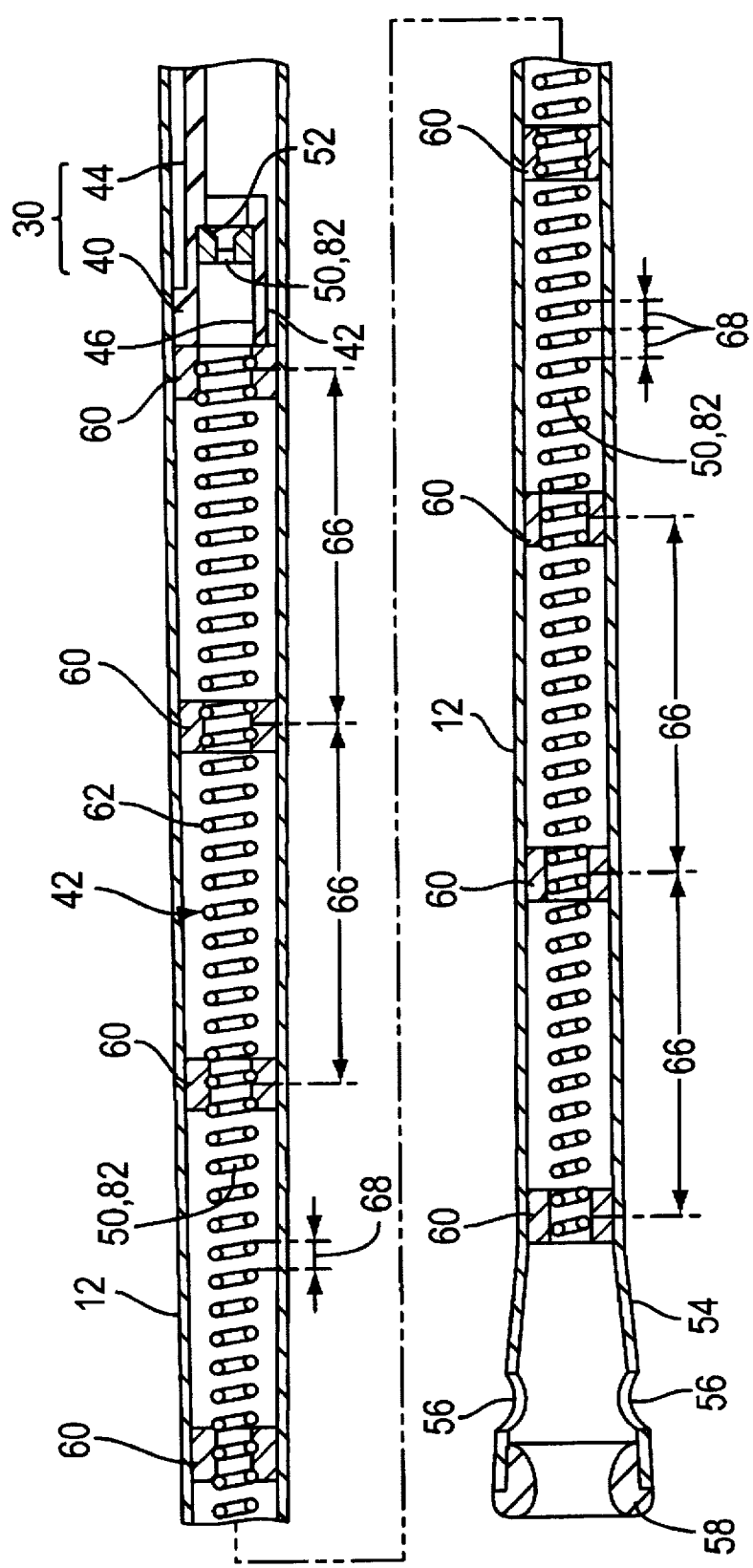
FIG. 2 is a longitudinal sectional side view of a line support and retainers before their insertion into a rod.

On the other hand, the line support 42 housed in the cylindrical section 40 is formed like a ring by forming on the front surface of a block body a small diameter hole 50 for inserting and passing a line and constructing a tapered line guide surface 52 that gradually widens rearwardly from the opening of the small diameter hole 50, as shown in FIG. 2. The material for the line support 42 includes hard materials such as ceramics and cermets (sintering materials) but may be a flexible material such as resin. The line support 42 is loaded into the through hole 46 of the cylindrical section 40, and the rear end of the connecting rod section 44 located in front of the cylindrical section 40 is inserted into the through hole 46 to contact the line support 42 in such a way that the line support 42 can be positioned appropriately. The connecting rod section 44 and the cylindrical section 40 are then bonded and fixed together, and the internal body is incorporated into the line support 42 while assembled. Once a plurality of units are connected to form the internal body 30, a line insertion and passage path 32 is formed from the small diameter hole for line insertion and passage 50 through the line guide surface 52 and the shaft center position of the connecting rod section 44. The connecting and fixation structure for each unit may comprise various fixation structures using fitting or bolting.

FIG. 2 shows that the first rod section 12 has a top guide installed at its rear end and that the top end 54 has installed at its tip a ring for guiding a line, with drain holes 56 formed behind the ring 58.

The tip structure of the first rod section 12 is described. FIG. 2 shows that the line support 42 and the retainers 60 for retaining the line support 42 are installed in front of the internal body 30. The line support 42 is a long spiral 62 along the shaft center of the rod, and the lower inner surface of the spiral 62 is used as a line support section 50 for substantially supporting a line. This allows the line support sections 50 to be arranged at the pitch of the spiral 62.

On the other hand, a plurality of retainers 60 are constructed along the shaft center of the spiral 62 to retain the line support 42. The retainer 60 is like a cylinder and retains the line support within its through hole 64 located in its center. These retainers 60 are arranged at a predetermined pitch 66 that is larger than the line support pitch 68 of the line support 50. This allows the line support pitch 68 to be small and prevents a line from falling from between adjacent line support sections 50 and contacting the inner surface of the rod or water.

Another tip structure for the first rod section 12 is shown in FIG. 4. FIG. 4 shows that a line support 42 and a retainer 60 for retaining the line support 42 are installed in front of the above internal body 30. The line support 42 comprises a long spiral 62 along the shaft center of the rod and a thin cylinder 70 externally fit to the spiral 62 for tightening and retaining the spiral 62. The spiral 62 has a small element wire diameter and a relatively high flexibility, and the thin cylinder 70 comprises a thermally contracting tube and is externally fit to the spiral 62 while adhering thereto. This enables the spiral 62 to constantly maintain its shape despite its small diameter provided to improve its flexibility in order to address the small diameter of the tip rod. The spiral 62 formed in this manner is a cylinder of a specified outer diameter along its length. An opener 72 is attached to the rear end of the thin cylinder 70, and a cylindrical retainer 60 externally fit to the opener 72 for retaining the line support 42 is constructed inside the first rod section 12. The front end of the line support 6 directly contacts the tapered inner surface of the first rod section 12 and is retained therein. This construction serves to maintain a space between the section behind the front end of the line support 42 and the inner circumferential surface of the first rod section 12.

Figure 5:
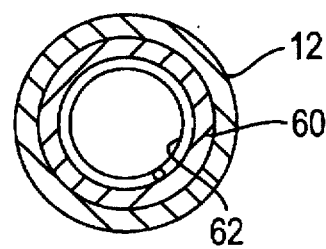
FIG. 5 is a longitudinal sectional side view of the retainers.

The retainer 60 of the configuration according to this invention can be configured as follows. It may be like a simple cylinder as shown in FIG. 5.

Figure 6:
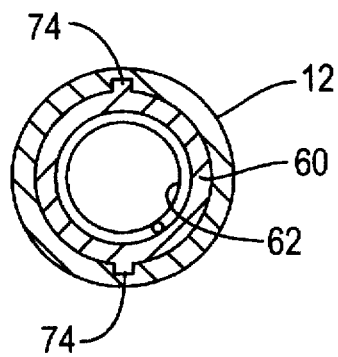
FIG. 6 is a longitudinal sectional side view illustrating another embodiment structure corresponding to FIG. 5.

As shown in FIG. 6, a cylinder-like body may be used as a base, and two engagement sections 74, may protrude from the outer circumferential surface of the body. An engagement groove for engaging the engagement sections 74 with the inner surface of the first rod section 12 is constructed in the shaft center direction of the first rod section 12 so that the retainer 60 can be moved in the shaft center direction of the first rod section 12 and that the outer ends of the engagement sections 74 can be fit in a predetermined position to the bottom surface of the engagement groove to fix the retainer 60. However, this is not shown in the drawings.

Figure 7:
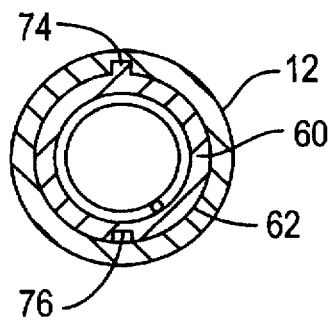
FIG. 7 is a longitudinal sectional side view illustrating another embodiment structure corresponding to FIG. 5.

As shown in FIG. 7, one of the engagement sections 74 may be formed in a depressed section 76. The depressed section 76 thus forms a path for moving water.

Figure 8:
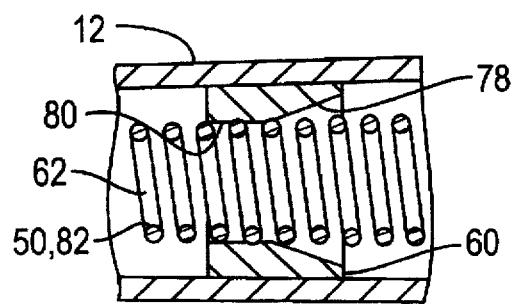
FIG. 8 is a longitudinal sectional side view illustrating another embodiment structure corresponding to FIG. 5.

As shown in FIG. 8, an insertion and passage hole 76 for inserting and passing the line support 42 may be formed in the shaft center of the block body, and a guidance inclined surface 78 may be constructed in one of the openings of the insertion and passage hole 80. The line support 60 of the configuration according to this invention may be configured as follows. The line support section 82 may be configured as follows.

Figure 9:
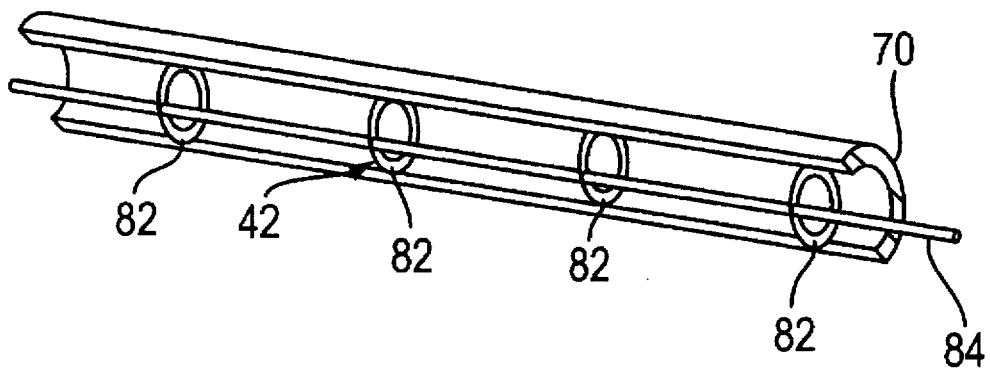
FIG. 9 is a perspective view illustrating another embodiment structure of a line support.

As shown in FIG. 9, a plurality of ring-like line support sections 82 may be arranged and connected by the connecting rod section 84 as a single unit. The reference numeral 62 in the figure designates a line support 42 constituted by configuring the line support sections 82 as a single unit using a connecting rod section 84 and covering the unit with a thin cylinder 70 such as a thermally contracting tube.

Figure 10:
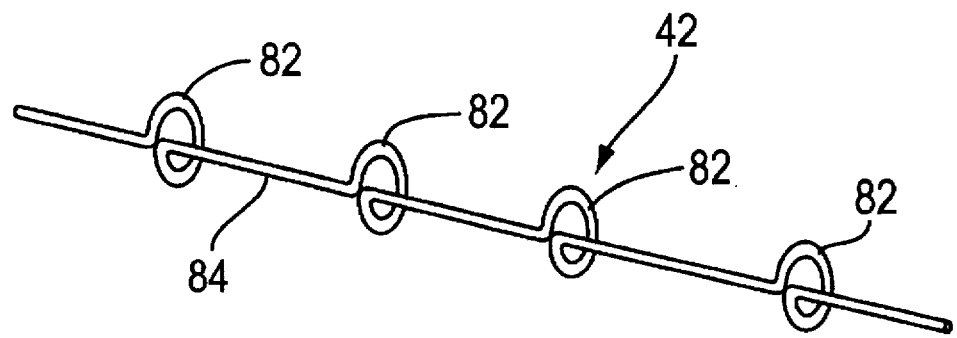
FIG. 10 is a perspective view illustrating another embodiment structure of a line support.

As shown in FIG. 10, the ring-like support sections 82 and the connecting rod section 84 may be formed of a single raw material, thus forming a unitary structure.

Figure 11:
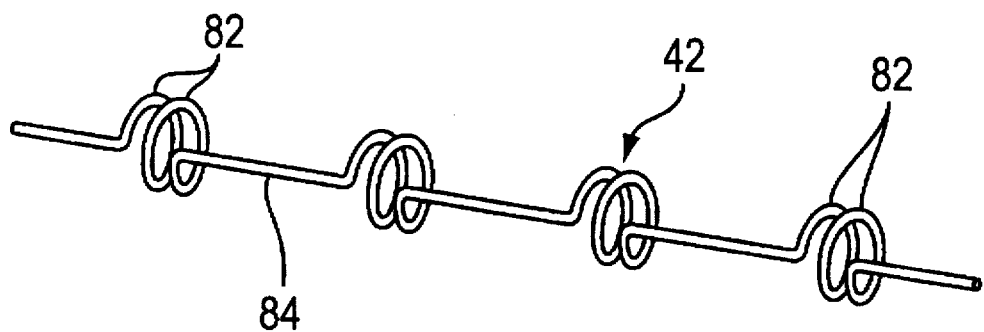
FIG. 11 is a perspective view illustrating another embodiment structure of a line support.

As shown in FIG. 11, the line support sections 82 of the above configuration may be formed of rings with a plurality of turns.

Figure 12:
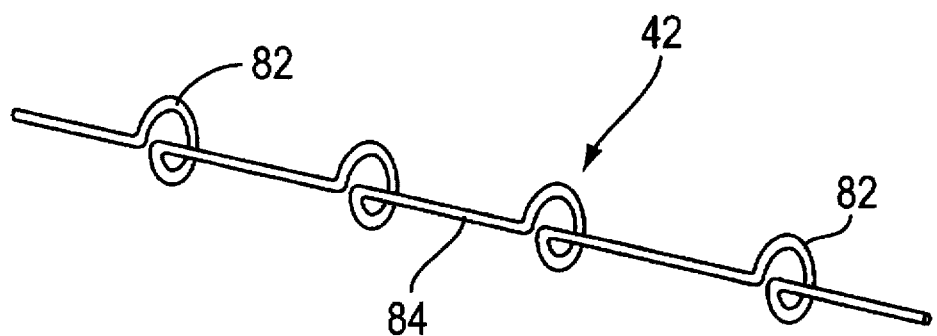
FIG. 12 is a perspective view illustrating another embodiment structure of a line support.

As shown in FIG. 12, the ring-like line support sections 82 need not form a closed loop but may form an open loop that opens in the connecting position of the connecting rod section 84. The connecting rod section 84 may be configured as follows.

Figure 13:
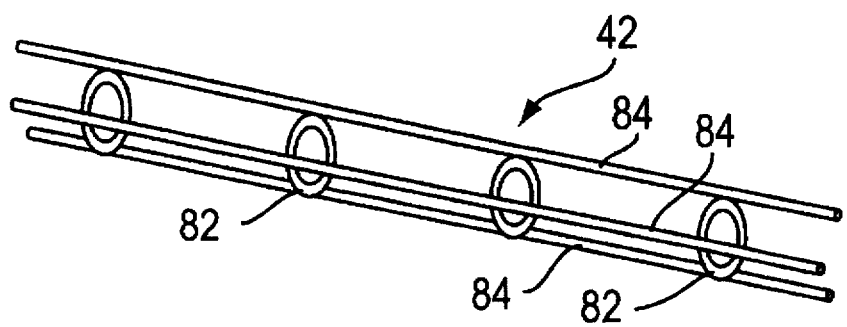
FIG. 13 is a perspective view illustrating another embodiment structure of a line support.
Figure 14:
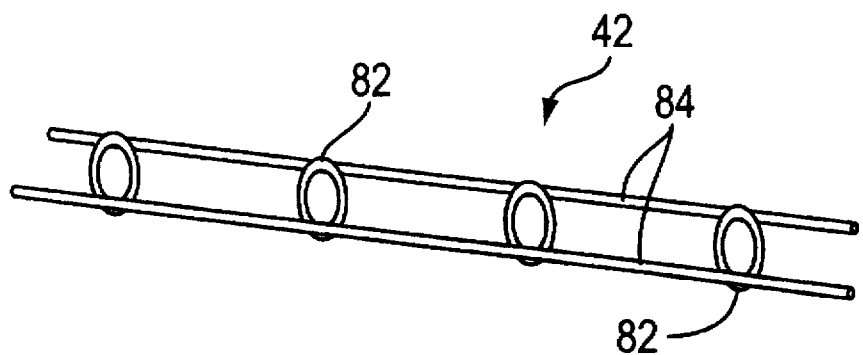
FIG. 14 is a perspective view illustrating another embodiment structure of a line support.

It may be circumferentially located in three positions, as shown in FIG. 13 It may be laterally located in two positions, as shown in FIG. 14.

The overall line support 42 may be configured as follows.

Figure 16:
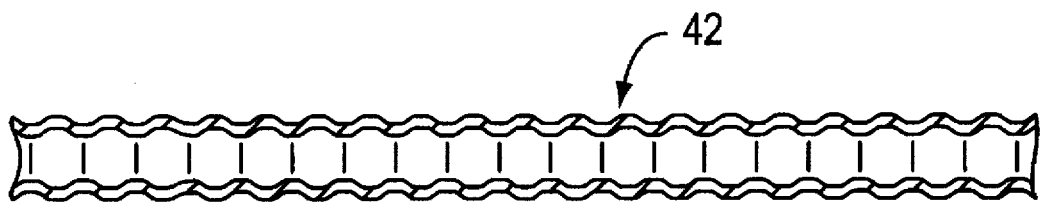
FIG. 16 is a longitudinal sectional side view of another embodiment structure of a line support.

As shown in FIG. 16, it may be formed like bellows having raised and depressed surfaces inside, with the raised surfaces used as line support sections 82.

Figure 17:
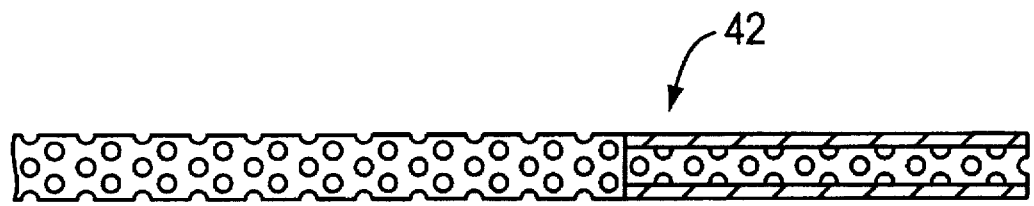
FIG. 17 is a longitudinal sectional side view of another embodiment structure of a line support.

As shown in FIG. 17, it may be a cylindrical body with many small holes drilled on its circumferential surface. The cylindrical body may comprise punching metal. It may comprise resin fibers laced up as a mesh. However, this is not shown in the drawings. Other embodiment structures are described as follows.

Figure 18:
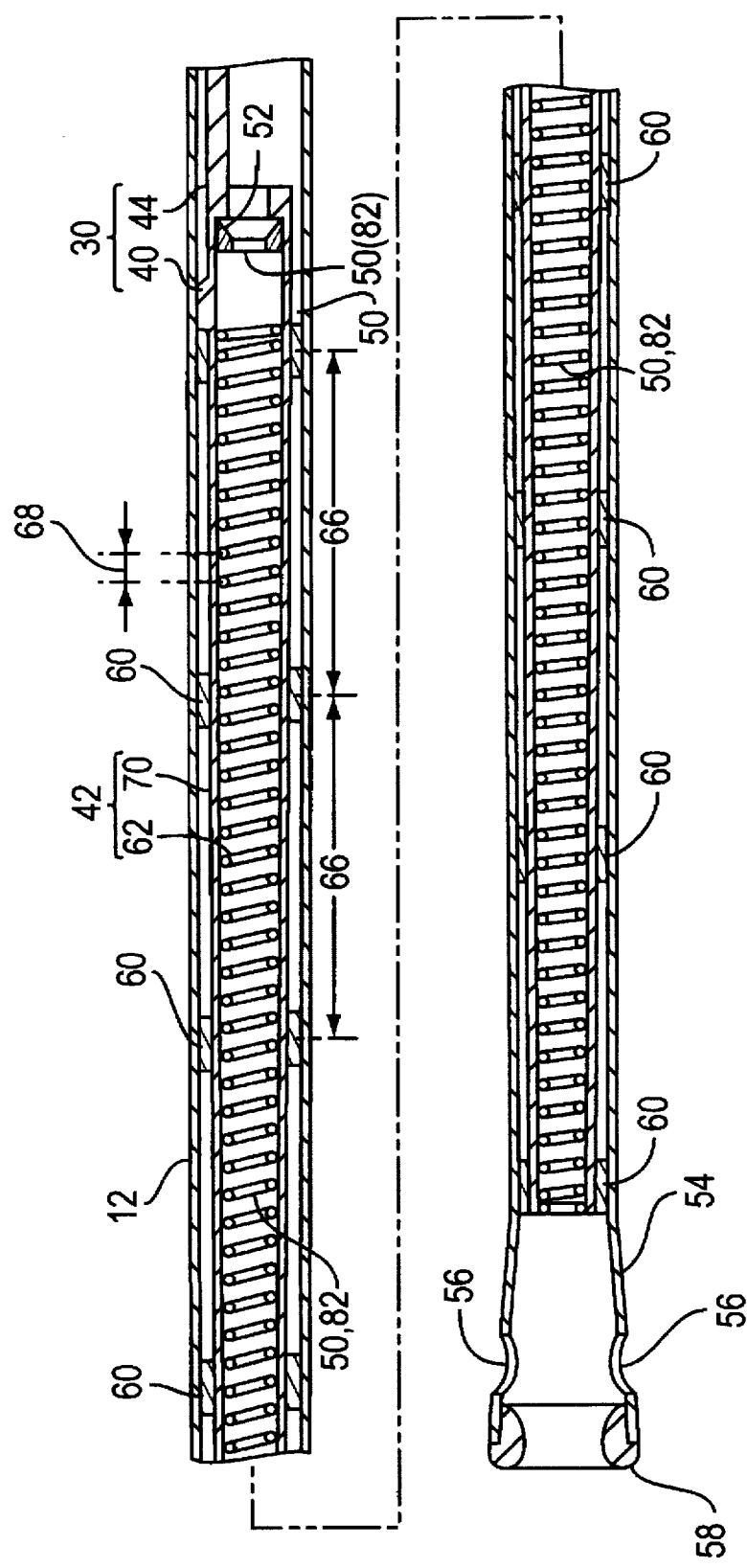
FIG. 18 is a longitudinal sectional side view illustrating a spiral integrated with a thermally contracting tube which replaces the line support in FIG. 2.

As shown in FIG. 18, the retainer 60 for retaining the line support 42 may be located in a plurality of positions including those in the large diameter section and the small diameter section. In this case, such an arrangement can be provided instead of the line support shown as the spiral 62 integrated using the thermally contracting tube 70. For example, the line support 42 may comprise the above single spiral.

Figure 15:
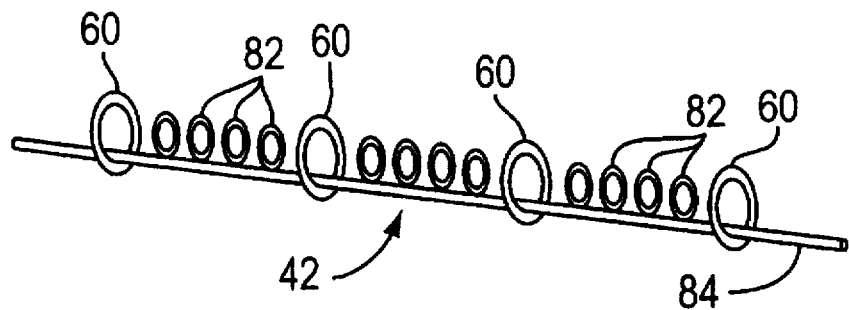
FIG. 15 is a perspective view of a line support and retainers integrated using a connecting rod section.
Figure 19:
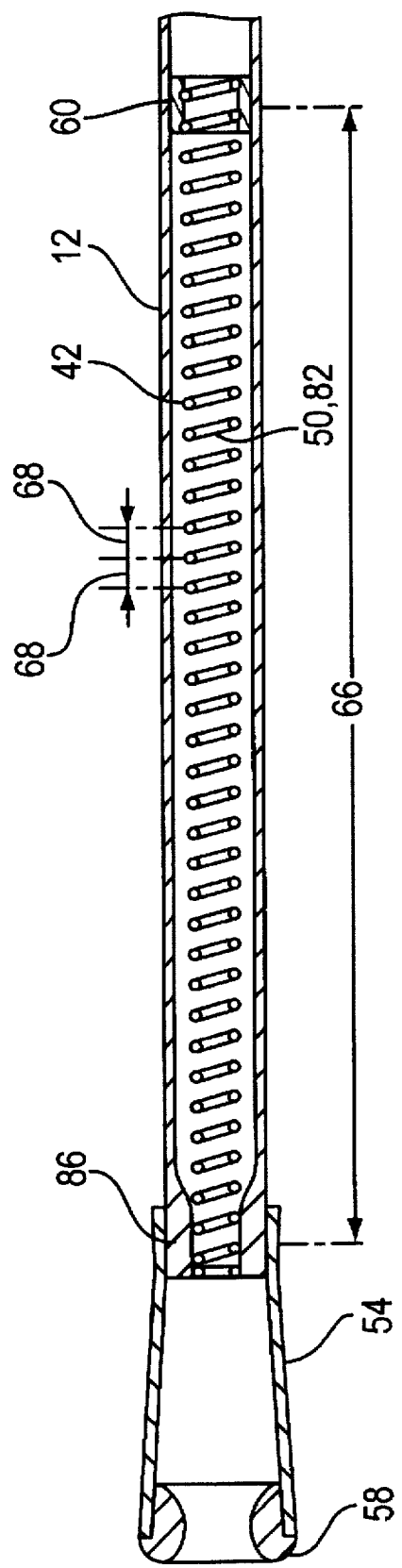
FIG. 19 is a longitudinal sectional side view illustrating a swelled section of the inner surface of a rod for supporting a line support so that the line support is spaced from the inner surface of a rod.

As shown in FIG. 15, a plurality of small diameter rings and large diameter rings may be alternatively located adjacent to each other on the same shaft center, and then connected together using the connecting rod section. In this case, the small diameter rings form a line support 82, and the large diameter rings form a retainer 60 contacting the inner circumferential surface of the first rod 12. As shown in FIG. 19, to support the spiral line support 42 spaced from the inner surface of the rod, the line support may be supported by the retainer 60 at the rear end of the rod, while, at the front end of the rod, it may be received by a swelled section 86 formed by inwardly swelling part of the inner surface of the rod.

All the above embodiments can be used for rods other than the tip rod such as an intermediate rod.

What is claimed is:

1. A pass-through fishing rod having a shaft center and an inner surface, said rod having a line support which comprises a plurality of line support sections having a line support pitch, said line support sections being spaced along said shaft center of said rod for supporting a fishing line and retained within said rod by a plurality of retainers including a front retainer, a rear retainer and a plurality of intermediate retainers, said retainers having a retention pitch, wherein said line support pitch of said line support sections is smaller than said retention pitch at which said line support is retained within said rod by said plurality of retainers while spaced from said inner surface of said rod, and wherein said line support comprises a spiral and a thin cylinder externally fit to the spiral.

2. The pass-through fishing rod of claim 1 wherein said thin cylinder is formed of a thermally contracting tube externally fitted to said spiral.

3. The pass-through fishing rod of claim 1 wherein said intermediate retainers are formed with a central aperture, said central aperture being formed with a tapered surface.

4. The pass-through fishing rod of claim 1 wherein said intermediate retainers are formed with at least one axially extending protrusion on an outer surface thereof which extends into a groove formed on an inner surface of said rod.

5. The pass-through fishing rod of claim 1 wherein said intermediate retainers are formed with at least one axially extending groove on an outer surface thereof which receives a protrusion formed on an inner surface of said rod.

6. The pass-through fishing rod of claim 1 wherein said intermediate retainers are formed with at least one axially extending groove on an outer surface thereof which receives a protrusion formed on an inner surface of said rod and said thin cylinder is formed with at least one axially extending groove on an outer surface thereof which receives a protrusion formed on an inner surface of said rod.

* * * * *